United States Patent
Brinkman et al.

(10) Patent No.: US 6,669,591 B1
(45) Date of Patent: Dec. 30, 2003

(54) RUBBER COMPOSITION FOR POWER TRANSMISSION BELTS

(75) Inventors: Paul Norman Brinkman, Lincoln, NE (US); Thomas George Burrowes, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/700,104

(22) PCT Filed: Jun. 19, 1998

(86) PCT No.: PCT/US98/11854
§ 371 (c)(1),
(2), (4) Date: Nov. 8, 2000

(87) PCT Pub. No.: WO99/65983
PCT Pub. Date: Dec. 23, 1999

(51) Int. Cl.[7] ................................................. F16G 1/00
(52) U.S. Cl. ...................... 474/264; 474/263; 474/271; 524/495; 524/496; 525/222; 525/206; 525/213; 525/197

(58) Field of Search ................................. 524/495, 496; 474/264, 263, 271; 525/222, 206, 213, 197

(56) References Cited

U.S. PATENT DOCUMENTS

| | | | |
|---|---|---|---|
| 4,180,531 A | 12/1979 | Alia | 525/214 |
| 5,322,479 A | 6/1994 | Le Devehat | 474/101 |
| 5,408,007 A | 4/1995 | Mizumo et al. | 525/305 |
| 5,626,953 A | 5/1997 | Fujimoto et al. | 428/296.4 |
| 5,654,099 A | 8/1997 | Pelton | 428/378 |
| 5,711,734 A | 1/1998 | Shioyama et al. | 474/260 |

*Primary Examiner*—Samuel A. Acquah
*Assistant Examiner*—U. K. Rajguru
(74) *Attorney, Agent, or Firm*—Bruce J. Hendricks; John D. DeLong

(57) ABSTRACT

This invention relates to power transmission belts and to a rubber composition for use therein. The composition contains from 90 to 10 phr alkylated chlorosulfonated polyethylene and 10 to 90 phr ethylene vinyl acetate.

20 Claims, No Drawings

RUBBER COMPOSITION FOR POWER TRANSMISSION BELTS

TECHNICAL FIELD

This invention relates to power transmission belts and to a rubber composition for use therein.

BACKGROUND ART

Continually increasing temperatures in the engine compartment of motor vehicles has resulted in conventional compounds such as neoprene becoming obsolete due to insufficient heat resistance. In many instances, a change has been made to hydrogenated nitrile butadiene rubber (HNBR). However, HNBR is a very expensive rubber. See e.g. U.S. Pat. No. 5,599,246. More recently, the use of alkylated chlorosulfonated polyethylene (ACSM) has been suggested as a lower cost alternative to HNBR. See e.g. U.S. Pat. No. 5,711,734; 5,408,007 and 5,626,953. While ACSM polymer suffer some deficiencies, such as retention of properties at elevated temperatures and oil resistance, when used by itself, we have found that blending the ACSM with ethylene vinyl acetate (EVM and curing the blends with an organic peroxide and a cure co-agent overcome those deficiencies.

U.S. Pat. No. 5,322,479 relates to a transmission belt comprising an alkylated chlorosulfonated ethylene-alpha-olefin copolymer (ACSM) matrix elastomer compound or a non-alkylated chlorosulfonated ethylene-alpha-olefin copolymer (CSM) matrix elastomers compound in addition to a hydrogenated butadiene-acrylonitrile copolymer matrix elastomer compound.

French Pat. No. 2,628,678 discloses the use of chlorosulfonated ethylene-alpha-olefin copolymer (CSM) matrix compounds for constructing belts. It, however, was noted in U.S. Pat. No. 5,322,479 that although the belts made with CSM exhibit a positive increase of operational characteristics at higher temperatures, such belts retain a sensitivity to oils which thereby reduces their performance in case of accidental contact with oil.

U.S. Pat. No. 4,180,531 discloses a method of promoting peroxide initiated crosslinking of CSM whereby the solubility of peroxide vulcanizing agents is increased. Increased peroxide solubility and/or processability is accomplished by blending ethylene vinyl acetate with CSM.

SUMMARY OF THE INVENTION

In accordance with the practice of present invention, there is provided a rubber composition comprising:

a. from 90 to 10 parts by weight per 100 parts of rubber (phr) of ACSM;
b. from 10 to 90 phr of EVM;
c. from 20 to 75 phr of carbon black; and
d. from 2 to 10 phr of an organic peroxide.

There is also disclosed a power transmission belt produced from a rubber composition comprising:

a. from 90 to 10 phr of ACSM; and
b. from 10 to 90 phr of EVM.

The ACSM used in the present invention is available from DuPont-Dow as ACSIUM HPR 6367. The EVM is available from Bayer as LEVAPREN 500HV.

Typical of the peroxide cure co-agents are trimethylolpropane trimethacrylate, trifunctional organosiloxanes, triallyl cyanurate and triallyl isocyanurate, 1,3-butylene glycol dimethacrylate, ethylene glycol dimethacrylate, and n,n'-m-phenylene-dimaleimide-1,2-cis-polybutadiene. While from 0.5 to 10 phr of the co-agent can be used, 1 to 4 phr are preferred.

Typical of the organic peroxides which can be used with invention are 1,3-bis(t-butylperoxy-1-propyl) benzene, dicumyl peroxide, α,α-bis(t-butylperoxy) valerate, α,α-bis (t-butylperoxy)diisopropyl benzene, 2,5-dimethyll-2, 5-di (t-butylperoxy)hexane, 1,1-bis(t-butylperoxy)-3,3,5-trimethylcyclohexane, n-butyl-4,4-bis(t-butylperoxy) valerate, and ethyl-3,3-bis(t-butylperoxy)butyrate. While 0.5 to 10 phr of the peroxide can be used, 1.5 to 4.5 phr are preferred. While 20 to 75 phr of carbon black can be used, we prefer a mixture of from 15 to 45 phr of a N550 carbon black from Cabot and from 5 to 30 phr of an SRF/N762 carbon black available from Cabot.

Experimental

TABLE 1

The following blends were mixed in a Banbury mixer:

| Material (phr) | Ex. 1 | Ex. 2 | Ex. 3 | Comparative Ex. |
|---|---|---|---|---|
| ACSM[1] | 60 | 60 | 60 | 100 |
| EVM[2] | 40 | 40 | 40 | |
| Peroxide[3] | 4 | 4 | 4 | 4 |
| Carbon black | 45 | 45 | 45 | 45 |
| Cure Co-Agent A | | 2 | | |
| Cure Co-Agent B | | | 2 | |
| Magnesium Oxide[4] | 3 | 3 | 3 | |
| Pentaerythritol[5] | 3 | 3 | 3 | 3 |

[1]ACSIUM HPR 6367.
[2]LEVAPREN 500 HV.
[3]Poly-Dispersion VC-60, Rhein Chemie.
[4]PLASTOMAG 170, Akrochem
[5]PE 200, Hercules Original physicals, compression modulus, oven-aged physicals and oil immersion physicals were run on the blends and are shown in Table 2.

TABLE 2

| Test | Ex. 1 | Ex. 2 | Ex. 3 | Comp. Ex. |
|---|---|---|---|---|
| Original Physicals | | | | |
| Tensile, MPa | 16.1 | 18.3 | 16.9 | 9.8 |
| Elongation, % | 390 | 233 | 225 | 549 |
| 10% Modulus, MPa | 0.683 | 0.717 | 0.759 | 0.786 |
| Shore A Hardness | 69 | 72 | 73 | 71 |
| Oven-Aged, 168 h/107° C. | | | | |
| 10% Modulus, MPa | 0.786 | 0.876 | 0.828 | 0.883 |
| % Change | 15 | 22 | 9 | 12 |
| Shore A Hardness | 73 | 76 | 75 | 76 |
| Change | 4 | 4 | 2 | 5 |
| Oven-Aged, 168 h/135° C. | | | | |
| 10% Modulus, MPa | 0.820 | 0.876 | 0.897 | 0.897 |
| % Change | 20 | 22 | 18 | 14 |
| Shore A Hardness | 74 | 76 | 76 | 75 |
| Change | 5 | 4 | 3 | 4 |
| IRM 903 Oil 70 h/100° C. | | | | |
| Volume Swell, % | 140 | 93 | 91 | 239 |
| 10% Modulus, MPa | 0.186 | 0.331 | 0.366 | 0.083 |
| % Change | −73 | −54 | −52 | −89 |
| Shore A Hardness | 33 | 54 | 57 | 12 |
| Change | −36 | −18 | −16 | −59 |

TABLE 2-continued

| Test | Ex. 1 | Ex. 2 | Ex. 3 | Comp. Ex. |
|---|---|---|---|---|
| Compression Modulus @ 133° C. | | | | |
| 11% Modulus, MPa | 0.628 | 1.062 | 1.062 | 0.421 |
| Tan.Delta @ Max S'* | 0.127 | 0.055 | 0.072 | 0.240 |

*Flexsys Rubber Process Analyzer

As the data indicate, the blends of ACSM/EVM exhibit better retention of modulus at elevated temperatures and improved resistance to oil.

A series of blends of ACSM/EVM were compared to an all ACSM compound, an all EVM compound and three compounds known to be used in positive drive belts comprising a sulfur cured HNBR, a peroxide cured HNBR and a Neoprene for: a) percent of torque S' at 38° C. which is retained at 135° C.; b) oil resistance as percent volume swell after aging seventy hours at 100° C. in IRM 903 oil; and c) the change in 10% modulus of each compound after being in oven for 168 hours @ 135° C. The results are shown in Tables 3, 4 and 5 respectively.

As the data indicate, significant improvement in retention of modulus at elevated temperatures and oil resistance versus ACSM can be achieved via an ACSM/EVM blend. The modulus retention results further show an unexpected synergistic effect between the ACSM and EVM, such that the %S' retained for certain blend ratios is higher than for ACSM or EVM alone.

TABLE 3

% of S' @ 38° C. Retained at 135° C.
ACSM/EVM vs. Other PD Compounds
RPA Cured Temperature Sweep, 100 cpm, 1 degree

| ACSM:EVM Ratio | % S' Retained |
|---|---|
| 100:0 | 60.6% |
| 90:10 | 65.5% |
| 80:20 | 66.2% |
| 70:30 | 77.7% |
| 60:40 | 87.6% |
| 50:50 | 96.0% |
| 40:60 | 94.3% |
| 20:80 | 103.5% |
| 0:100 | 90.3% |
| S-Cured HNBR | 63.5% |
| Peroxide Cured HNBR | 76.6% |
| Neoprene | 84.4% |

TABLE 4

Oil Resistance of ACSM/EVM Blends vs. Other PD Compounds
Volume Change After 70 Hours @ 100° C. in IRM903 Oil

| ACSM:EVM Ratio | % Volume Change |
|---|---|
| 100:0 | 151% |
| 90:10 | 142% |
| 80:20 | 116% |
| 70:30 | 109% |
| 60:40 | 97% |
| 50:50 | 87% |
| 40:60 | 80% |
| 20:80 | 78% |
| 0:100 | 79% |
| S-Cured HNBR | 7% |
| Peroxide Cured HNBR | 14% |
| Neoprene | 64% |

TABLE 5

Heat Aging Resistance of ACSM/EVM Blends vs. Other PD Compounds
% Change in 10% Modulus After Oven Aging for 168 Hours @ 135° C.

| ACSM:EVM Ratio | % Change in 10% Modulus |
|---|---|
| 100:0 | 24% |
| 90:10 | 22% |
| 80:20 | 20% |
| 70:30 | 26% |
| 60:40 | 28% |
| 50:50 | 22% |
| 40:60 | 9% |
| 20:80 | 8% |
| 0:100 | −5% |
| S-Cured HNBR | 247% |
| Peroxide Cured HNBR | 60% |
| Neoprene | 391% |

While certain representative embodiments and details have been shown for the purpose of illustrating the invention, it will be apparent to those skilled in this art that various changes and modifications may be made therein without departing from the spirit or scope of the invention.

What is claimed is:

1. A power transmission belt produced from a rubber composition comprising;
    a. from 90 to 10 parts by weight of an alkylated chlorosulfonated polyethylene; and
    b. from 10 to 90 parts by weight of an ethylene vinyl acetate copolymer.

2. The belt according to claim 1 further comprising from 20–75 parts by weight of carbon black and from 2–10 parts by weight of an organic peroxide.

3. The belt according to claim 2 further comprising from 0.5 to 10 parts by weight of a peroxide cure co-agent.

4. The belt according to claim 1, wherein the composition comprises
    a. from 60 to 10 parts by weight of an alkylated chlorosulfonated polyethylene;
    b. from 40 to 90 parts by weight of an ethylene vinyl acetate copolymer.

5. The belt according to claim 1, wherein the composition exhibits a maximum in retained torque at maximum cure S' at an alkylated chlorosulfonated polyethylene to ethylene vinyl acetate weight ratio of about 20:80.

6. The belt according to claim 1, wherein the composition exhibits a maximum in retained torque at maximum cure S' at an alkylated chlorosulfonated polyethylene to ethylene vinyl acetate weight ratio of from about 60:40 to about 10:90.

7. The belt according to claim 1, wherein the composition exhibits a maximum in retained torque at maximum cure S'.

8. The belt according to claim 1, wherein the composition exhibits a retained torque at maximum cure S' at an alkylated chlorosulfonated polyethylene to ethylene vinyl acetate weight ratio of from about 60:40 to about 10:90 that is greater than the retained torque at maximum cure S' for the composition at an alkylated chlorosulfonated polyethylene to ethylene vinyl acetate weight ratio of 100:0 or 0:100.

9. The belt according to claim 1, wherein the composition exhibits a retained torque at maximum cure S' at an alkylated chlorosulfonated polyethylene to ethylene vinyl acetate weight ratio of about 20:80 that is greater than the retained torque at maximum cure S' for the composition at an alkylated chlorosulfonated polyethylene to ethylene vinyl acetate weight ratio of 100:0 or 0:100.

10. The belt according to claim 1, wherein the composition exhibits a retained torque at maximum cure S' that is greater than the retained torque at maximum cure S' for the composition at an alkylated chlorosulfonated polyethylene to ethylene vinyl acetate weight ratio of 100:0 or 0:100.

11. The belt according to claim 1, wherein the composition exhibits a maximum in retained modulus at an alkylated chlorosulfonated polyethylene to ethylene vinyl acetate weight ratio of about 20:80.

12. The belt according to claim 1, wherein the composition exhibits a maximum in retained modulus at an alkylated chlorosulfonated polyethylene to ethylene vinyl acetate weight ratio of from about 60:40 to about 10:90.

13. The belt according to claim 1, wherein the composition exhibits a maximum in retained modulus.

14. The belt according to claim 1, wherein the composition exhibits a retained modulus at an alkylated chlorosulfonated polyethylene to ethylene vinyl acetate weight ratio of from about 60:40 to about 10:90 that is greater than the retained modulus for the composition at an alkylated chlorosulfonated polyethylene to ethylene vinyl acetate weight ratio of 100:0 or 0:100.

15. The belt according to claim 1, wherein the composition exhibits a retained modulus at an alkylated chlorosulfonated polyethylene to ethylene vinyl acetate weight ratio of about 20:80 that is greater than the retained modulus for the composition at an alkylated chlorosulfonated polyethylene to ethylene vinyl acetate weight ratio of 100:0 or 0:100.

16. The belt according to claim 1, wherein the composition exhibits a retained modulus that is greater than the retained modulus for the composition at an alkylated chlorosulfonated polyethylene to ethylene vinyl acetate weight ratio of 100:0 or 0:100.

17. The belt according to claim 1, wherein the belt shows a greater than 77.7 percent retention of modulus over a temperature range of 38° C. to 135° C.

18. The belt according to claim 1, wherein the belt shows a greater than 87.6 percent retention of modulus over a temperature range of 38° C. to 135° C.

19. The belt according to claim 1, wherein the belt shows a greater than 94.3 percent retention of modulus over a temperature range of 38° C. to 135° C.

20. The belt according to claim 1, wherein the belt shows a greater than 96.0 percent retention of modulus over a temperature range of 38° C. to 135° C.

* * * * *